United States Patent
Lee et al.

(10) Patent No.: US 9,367,476 B2
(45) Date of Patent: Jun. 14, 2016

(54) MEMORY MANAGEMENT APPARATUS, METHOD, AND SYSTEM

(71) Applicant: RESEARCH & BUSINESS FOUNDATION SUNGKYUNKWAN UNIVERSITY, Suwon-si (KR)

(72) Inventors: Joonwon Lee, Seoul (KR); Jinkyu Jeong, Goyang-si (KR); Hwanju Kim, Daejeon (KR); Jaeho Hwang, Daejeon (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 89 days.

(21) Appl. No.: 14/047,579

(22) Filed: Oct. 7, 2013

(65) Prior Publication Data
US 2014/0156944 A1 Jun. 5, 2014

(30) Foreign Application Priority Data
Nov. 30, 2012 (KR) .......................... 10-2012-0138237

(51) Int. Cl.
*G06F 3/00* (2006.01)
*G06F 12/08* (2016.01)
*G06F 5/00* (2006.01)

(52) U.S. Cl.
CPC ........ *G06F 12/0897* (2013.01); *G06F 12/0871* (2013.01); *G06F 2212/6012* (2013.01)

(58) Field of Classification Search
None
See application file for complete search history.

(56) References Cited

U.S. PATENT DOCUMENTS

| | | | | |
|---|---|---|---|---|
| 5,287,482 A * | 2/1994 | Arimilli et al. | ............... | 711/130 |
| 5,526,510 A * | 6/1996 | Akkary et al. | ............... | 711/133 |
| 5,659,709 A * | 8/1997 | Quach | ........................... | 711/146 |
| 5,715,430 A * | 2/1998 | Hirayama | .................... | 711/141 |
| 5,918,249 A * | 6/1999 | Cox et al. | ...................... | 711/203 |
| 2004/0078518 A1 * | 4/2004 | Kuwata | ......................... | 711/113 |
| 2005/0193160 A1 * | 9/2005 | Bhatt et al. | ........................ | 711/3 |
| 2005/0283597 A1 * | 12/2005 | Holzmann | ........................ | 713/2 |

OTHER PUBLICATIONS

Jinkyu Jeong et al. "DaaC: Device-reserved Memory as an Eviction-based File Cache" Embedded Systems Week, www.esweek.org, (Oct. 2012) pp. 191-200.

* cited by examiner

*Primary Examiner* — Henry Tsai
*Assistant Examiner* — Dean Phan

(57) ABSTRACT

The present invention discloses a memory management apparatus, method, and system. An OS-based memory management apparatus associated with main memory includes a memory allocation controller configured to control a first memory region within the main memory such that the first memory region is used as a buffer cache depending on whether an input/output device is active or not in order to use the first memory region, allowing memory reservation for the input/output device, in the OS. The memory allocation controller controls the first memory region such that the first memory region is used as an eviction-based cache.

16 Claims, 7 Drawing Sheets

MEMORY MANAGEMENT APPARATUS, METHOD, AND SYSTEM

Priority to Korean patent application number 10-2012-0138237 filed on Nov. 30, 2012, the entire disclosure of which is incorporated by reference herein, is claimed.

BACKGROUND OF THE INVENTION

1. Field of the Invention

The present invention relates to a memory management apparatus, method, and system and, more particularly, a memory management apparatus, method, and system for continuous memory allocation to a device in a computer system.

This application of the present invention is the results of researches supported and carried out under a research project "Smart TV 2.0 Software Platform" (Government Project Unique Number No. 10041244) of SW Computing Industry Original Technology Development Project supervised by Korea Evaluation Institute of Industrial Technology (KEIT) under the Ministry of Knowledge Economy (MKE).

2. Discussion of the Related Art

In a system in which physically contiguous memory is only reserved, but is not used, memory is wasted. In general, devices that require physically contiguous memory are not always used, but they have an idle time. Reserved memory is wasted as a share of the idle time is increased.

In a recent related prior art, the allocation of reserved memory to data that can be migrated in an Operation System (OS) is permitted. This technology, however, requires a long time that is taken for a reserved region to be used by a device if a dirty page and a virtual memory page are present in a reserved memory region. This is because a unit time taken to move data included in each page is great. If such a time is increased, there is a problem in that the time taken to drive an application (e.g., a camera or a video playback program) dependent on a device is increased.

SUMMARY OF THE INVENTION

An object of the present invention is to provide a memory management apparatus, method, and system, which enables reserved memory to be used in software including an OS and returns a physically contiguous memory region within a short time when a device requires the physically contiguous memory region.

In according to with an aspect of the present invention, an OS-based memory management apparatus associated with main memory includes a memory allocation controller configured to control a first memory region within the main memory such that the first memory region is used as a buffer cache depending on whether an input/output device is active or not in order to use the first memory region, allowing memory reservation for the input/output device, in the OS, wherein the memory allocation controller may control the first memory region such that the first memory region is used as an eviction-based cache.

The memory management apparatus may further include a first buffer cache within the OS, wherein the first memory region may be used as the eviction-based cache for caching pages evicted from the first buffer cache.

The memory allocation controller may control the original copy of data cached in the first memory region so that the original copy is stored in an external storage space.

The memory allocation controller may control the first memory region such that all contents cached in the first memory region are discarded and the first memory region is immediately used by the input/output device if the first memory region is desired to be used by the input/output device.

The first memory region may be managed according to a Least Recently Used (LRU) method, a page evicted from the first buffer cache may be placed in a Most Recently Used (MRU) location of the first memory region, and when the first buffer cache accesses the evicted page, the evicted page may be migrated to the first buffer cache.

The first memory region may include at least one predefined region, each input/output device may be allocated to the predefined region, and the predefined region may be calculated based on a continuous region required by a system when the system boots up.

If the input/output device requests to allocate the predefined region, all continuous memory regions may be allocated to the input/output device although the input/output device requests to allocate all the continuous memory regions simultaneously, and a continuous memory region not belonging to the predefined region may not be allocated to the input/output device.

If a continuous memory request is received from the input/output device, the memory allocation controller may allocate a memory region within the first memory region to the input/output device based on an allocation cost for the predefined region of the input/output device in order to improve cache efficiency of the first memory region.

The allocation cost of the predefined region may be calculated using an LRU location if a cached page is to be discarded.

The memory allocation controller may allocate a region having a minimum allocation cost, from the predefined region, to the input/output device.

In according to with another aspect of the present invention, a method of managing, by an OS-based memory management apparatus associated with main memory, memory, includes a memory allocation control step of controlling a first memory region within the main memory such that the first memory region is used as a buffer cache depending on whether an input/output device is active or not in order to use the first memory region, allowing memory reservation for the input/output device, in the OS, wherein the first memory region is used as an eviction-based cache.

The first memory region may be used as the eviction-based cache for caching pages evicted from the first buffer cache within the OS.

The memory allocation control step may include controlling the first memory region such that all contents cached in the first memory region are discarded and the first memory region is immediately used by the input/output device if the first memory region is desired to be used by the input/output device.

The first memory region may be managed according to a Least Recently Used (LRU) method, a page evicted from the first buffer cache may be placed in a Most Recently Used (MRU) location of the first memory region, and when the first buffer cache accesses the evicted page, the evicted page may be migrated to the first buffer cache.

The first memory region may include at least one predefined region, each input/output device may be allocated to the predefined region, and the predefined region may be calculated based on a continuous region required by a system when the system boots up.

The memory allocation control step may include allocating a memory region within the first memory region to the input/output device based on an allocation cost for the predefined region of the input/output device in order to improve cache efficiency of the first memory region if a continuous memory request is received from the input/output device.

The allocation cost of the predefined region may be calculated using an LRU location if a cached page is to be discarded.

The memory allocation control step may include allocating a region having a minimum allocation cost, from the predefined region, to the input/output device.

In according to with yet another aspect of the present invention, a memory system includes main memory configured to comprise a first memory region that allows memory reservation for an input/output device and an operating system associated with the main memory, wherein an operating system uses the first memory region as a buffer cache depending on whether the input/output device is active or not in order to use the first memory region in the OS, and the first memory region is used as an eviction-based cache.

DETAILED DESCRIPTION OF THE EMBODIMENTS

Figure 1:
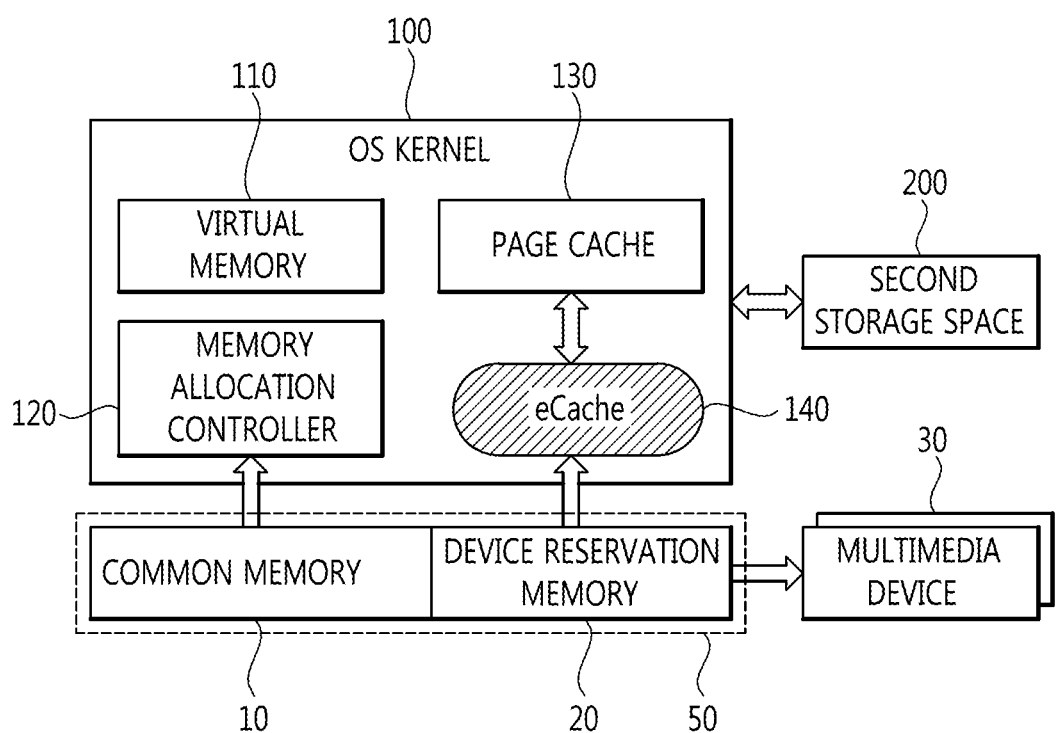
FIG. 1 is a block diagram schematically showing the construction of a memory management apparatus in accordance with an embodiment of the present invention.

The present invention may be modified in various ways and may be implemented to have several embodiments. Specific embodiments are illustrated in the drawings and are described in detail.

It is however to be noted that the present invention is not intended to be limited to the specific embodiments of the present invention, but it is to be understood that the specific embodiments include all modifications, equivalents to substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term 'and/or' includes a combination of a plurality of pertinent and described items or any one of a plurality of pertinent and described items.

When it is said that one element is 'connected' or 'coupled' with the other element, it should be understood that one element may be directly connected or coupled with the other element, but a third element may exist between the two elements. In contrast, when it is said that one element is 'directly connected' or 'directly coupled' with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as 'comprise' or 'have', are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All the terms used herein, unless otherwise defined, have the same meanings which are typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some exemplary embodiments of the present invention are described in detail with reference to the accompanying drawings. In describing the present invention, in order to help general understanding, the same reference numerals designate the same elements throughout the drawings and a redundant description of the same elements is omitted.

FIG. 1 is a block diagram schematically showing the construction of a memory management apparatus 100 in accordance with an embodiment of the present invention. As shown in FIG. 1, the memory management apparatus 100 in accordance with an embodiment of the present invention can include virtual memory 110, a memory allocation controller 120, and a page cache (or also called a buffer cache) 130.

Referring to FIG. 1, the memory management apparatus 100 is based on an OS kernel. The memory management apparatus 100 is associated with main memory 50. The memory management apparatus 100 can exchange data with the main memory 50 and use a storage space of the main memory 50 according to circumstances. The main memory 50 can include common memory 10 and device reservation memory 20. Here, the allocation of the common memory 10 is performed through the memory allocation controller 120 of the memory management apparatus 100 based on an OS. In accordance with an embodiment of the present invention, the allocation of a memory space of the device reservation memory 20 in addition to the common memory 10 can also be performed through the memory allocation controller 120. The device reservation memory 20 is memory that has been previously reserved for at least one multimedia device 30 (also called an I/O device) and is a memory region that may be used or may not be used depending on whether a device is active or not. Here, the multimedia device 30 may be a camera device, a moving image encoder/decoder or the like. The device reservation memory 20 can be used for video decoding, photographing, or firmware. However, the device reservation memory 20 may be used or may not be used depending on whether the multimedia device 30 is active or not. If the device reservation memory 20 is not used, a memory space may be wasted.

The virtual memory 110 is one of methods of managing memory, and the virtual memory 110 adopts a method of assigning a virtual memory address not a real memory address to each program. The virtual memory 110, unlike the page cache 130, corresponds to a stack or heap, that is, pages that form a process.

Accordingly, in accordance with an embodiment of the present invention, the memory management apparatus 100 based on an OS kernel can use the device reservation memory 20 as an eviction-based cache (also called eCache) 140. In order to use the device reservation memory 20 in the OS, the memory management apparatus 100 uses the eviction-based cache 140. A region of the device reservation memory 20 can be used as the eviction-based cache 140 if the multimedia device 30 is not in an active state. The eviction-based cache 140 is a second buffer cache for caching pages evicted from the page cache 130 within the kernel. That is, data that is less important than data within the page cache 130, that is, the buffer cache within the kernel, is evicted, and the evicted data is managed in the eviction-based cache 140. Thus, if data is sought to be read from a disk or flash memory, slow read I/O can be avoided if a desired data is found in the eviction-based cache 140. Furthermore, the memory management apparatus 100 in accordance with an embodiment of the present invention can exchange data with a second storage space 200. Before evicting data, the memory management apparatus 100 synchronizes modified data within the page cache 130 with data within the second storage space 200. Accordingly, although data stored in the eviction-based cache 140 is discarded, the consistency of data between the page cache 130, the eviction-based cache 140, and the second storage space 200 is not broken.

In accordance with another embodiment of the present invention, if a region of the device reservation memory 20 is desired to be used by the multimedia device 30, all contents cached in the eviction-based cache 140 are discarded and a region of the device reservation memory 20 reserved by the multimedia device 30 can be immediately used. Although contents belonging to the eviction-based cache 140 are discarded as described above, an abnormal operation of a system is not generated because the original copy is stored in the second storage space 200, such as a disk or flash memory. Furthermore, a unit time taken to evict the contents of each page is very small because the eviction-based cache 140 manages each page frame with less overhead than that of the OS. Accordingly, a memory space can be rapidly provided to the multimedia device 30.

In order to cooperate with the page cache 130 within the OS kernel, the eviction-based cache 140 provides 4 interfaces (e.g., put_page( ), get_page( ), flush_page( ), and flush_inode ( )). First, if a file page within the page cache 130 is a target of a page substitution within the kernel, the interface 'put_page( )' can be used. Furthermore, if the kernel requests to read a file page that is not present in the page cache 130, the interface 'get_page( )' is used. That is, if the requested file page is present in the eviction-based cache 140, data within the requested file page is copied to a page of the page cache 130. The interfaces 'flush_page( )' and 'flush_inode( )' are used when specific pages within a file or all files are removed from a file system.

Figure 2:
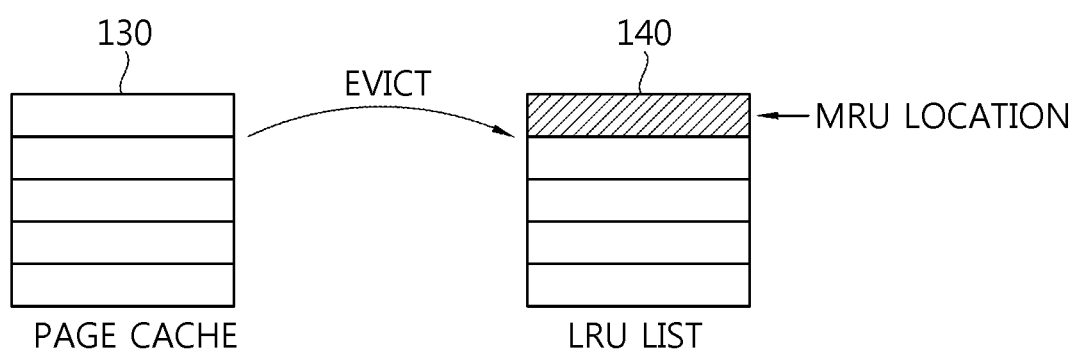
FIG. 2 is a diagram illustrating a page location when a page cache within the OS of the memory management apparatus evicts a page to an eviction-based cache in accordance with an embodiment of the present invention.

FIG. 2 is a diagram illustrating a page location when the page cache 130 within the OS of the memory management apparatus 100 evicts a page to the eviction-based cache 140 in accordance with an embodiment of the present invention. As shown in FIG. 2, when the page cache 130 of the memory management apparatus 100 in accordance with an embodiment of the present invention evicts a page to the eviction-based cache 140, the location of a page is determined according to a Least Recently Used (LRU) method.

Referring to FIG. 2, a continuous memory region required by a device, such as the multimedia device 30, can be checked in a system development stage. The OS manages a memory region, corresponding to the total sum of required memory regions, as the eviction-based cache 140.

A case where data is cached in the eviction-based cache 140 corresponds to a case where pages are evicted from a buffer cache (i.e., the page cache 130) within the OS. Pages within the eviction-based cache 140 are managed according to the LRU method (or another alternative policy). Accordingly, when one page is evicted from the page cache 130, the evicted page is placed at a Most Recently Used (MRU) location of an LRU list. When a page is accessed by the page cache 130 again within the OS kernel, the accessed page is promoted in the eviction-based cache 140, and thus corresponding data is migrated to the page cache 130 within the kernel. If the eviction-based cache 140 is exclusively managed, the data disappears from the eviction-based cache 140 when the page is promoted.

For continuous memory allocation for a device, such as the multimedia device 30, a Predefined Region (PR) is present in the eviction-based cache 140. The predefined region may be present in order to prevent a fragmentation problem. For example, memory regions of 2 and 3 pages need to be allocated to respective 2 devices. If the device that uses the 2 page uses the pages 2 and 3, there is a problem in that the continuous 3 page is not allocated to a device using the remaining pages 1, 4, and 5. This problem can be solved by allocating a predefined region to each device.

Each region means a memory region that can be allocated to each device. That is, each region can be seen as a candidate region. Each region is calculated based on a continuous region that is necessary for a system in a system boot-up stage. A device cannot be assigned memory from a continuous region that does not belong to a predefined region. Instead, if allocation is permitted only in a predefined region, all devices within a system can be assigned memory although they request continuous memory region allocation at the same time.

Figure 3:
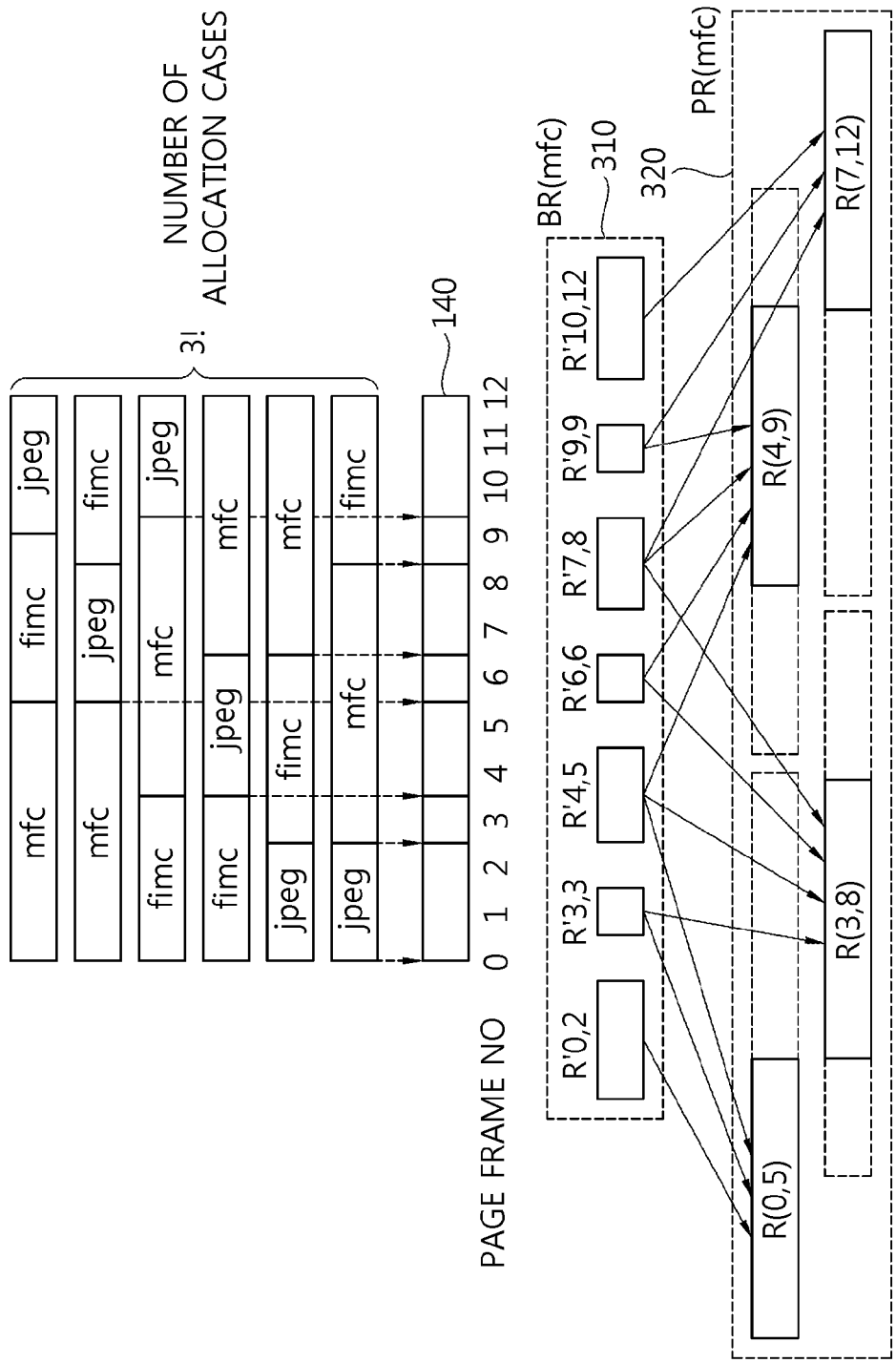
FIG. 3 is a conceptual diagram illustrating a process of calculating a cost for continuous memory allocation in the memory management apparatus in accordance with an embodiment of the present invention.

FIG. 3 is a conceptual diagram illustrating a process of calculating a cost for continuous memory allocation in the memory management apparatus 100 in accordance with an embodiment of the present invention. In accordance with an embodiment of the present invention, the number of 6 memory allocation cases can be represented for continuous memory allocation. That is, if 3 devices (e.g., mfc, fimc, and jpeg) request 6, 4, and 3 continuous page frames, the number of 6 (3!) cases can be taken into consideration as shown on the upper side of FIG. 3. An allocation cost can be calculated based on a potential cost (e.g., a possibility that data may be read in the future) when data included in pages within the eviction-based cache 140 is discarded in order to allocate memory to a device.

If a predefined memory region 320 for each device is defined as PR(d) (d is the device), PR(d) can mean a set of the memory regions of each device. Furthermore, PR(d) can be represented as a page frame $R_{a,b}$ having indices from a to b. For example, since the predefined region 320 of the device 'mfc' requires 6 page frames, it can be represented as PR(mfc)= $\{R_{0,5}, R_{3,8}, R_{4,9}, R_{7,12}\}$. That is, the predefined region 320 can be allocated to page frames from 0 to 5, page frames from 3 to 8, page frames from 4 to 9, and page frames from 7 to 12. Such a disposition of the regions can be said to be an indispensable disposition in order to allocate the 3 and 4 page frames to the respective devices 'jpeg' and 'fimc'. This is because memory regions having the 3 and 4 sizes for other devices cannot be allocated to page frames from 0 to 1 if page frames $R_{2,7}$ from 2 to 7 are allocated.

As described above, first, the predefined memory region 320 for a specific device is selected, a region having the smallest allocation cost is selected from the selected predefined memory region 320, and the selected region is allocated to the specific device. An allocation cost is calculated by dividing the allocation cost by a Base Region (BR) 310 in order to avoid redundant calculation. The base region 310 can be represented as BR(d). That is, the base region 310 is generated by dividing each predefined region 320 so that the predefined regions do not overlap with each other. The base region 310 of the device 'mfc' of FIG. 3 can be represented as BR(mfc)=$\{R_{0,2}', R_{3,3}', R_{4,5}', R_{6,6}', R_{7,8}', R_{9,9}', R_{10,12}'\}$. Next, an allocation cost for each predefined memory region 320 is calculated using the base region 310. The predefined region 320 having the smallest value calculated based on each calculation result is selected as a memory region to be actually allocated to the device 'mfc'.

Figure 4:
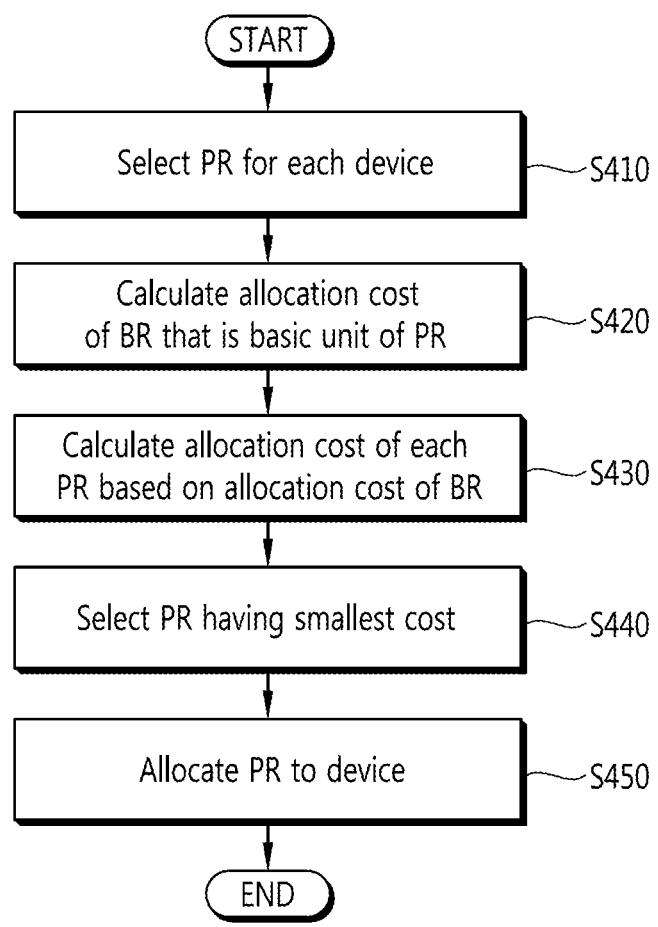
FIG. 4 is a detailed flowchart illustrating a process of calculating, by the memory management apparatus, a cost in accordance with an embodiment of the present invention.

FIG. 4 is a detailed flowchart illustrating a process of calculating, by the memory management apparatus, a cost in accordance with an embodiment of the present invention.

Referring to FIG. 4, when a memory allocation request is received from a device, the predefined region 320 for the device associated with the request is selected at step S410. Referring to FIG. 3, $R_{0,5}, R_{3,8}, R_{4,9}$, and $R_{7,12}$ can be selected as the predefined region 320 for the device 'mfc'. In order to calculate an allocation cost of the selected predefined region 320, an allocation cost of a base region 310 (i.e., a base unit for preventing redundancy) of the predefined region 320 is calculated at step S420. That is, assuming that Ci is an allocation cost for an $i^{th}$ page, Ci can be represented as $C(R_{a,b}) = \Sigma_{R'_{a,b} \in R}(\Sigma_{i=a}^{b} C_i)$. Here, R' means the base region 310. The point in calculating an allocation cost is to calculate a possibility that read I/O is caused when data within a page is discarded how precisely. A core characteristic of Ci is that an important page has a greater value. That is, an LRU distance indicative of an offset from an LRU position within an LRU list is an appropriate candidate value of Ci. That is, the LRU distance of an $i^{th}$ page can be represented as 'li'. This value is similar to the inverse of a stack distance. If a page has recently been added to the eviction-based cache 140, the added page is disposed in the MRU location. Since a recently added page has the highest possibility that the added page may be accessed, the LRU distance of the added page is the greatest within the eviction-based cache 140. Accordingly, Ci can be defined as follows using 'li'.

$$C_i = \begin{cases} \infty & \text{when an } i^{th} \text{ page is allocated to another device} \\ l_i & \text{Otherwise} \end{cases}$$

That is, since an allocation cost of a page allocated to another device is infinitely converged, the predefined region 320 already having one or more allocated pages for another device is not selected in the reservation of the device. An LRU distance value of each page can be calculated by searching the LRU list when device memory allocation is requested. In accordance with an embodiment of the present invention, an allocation cost can be calculated using an LRU location. That is, a page placed in the MRU location has a cost of 0, and a page placed in the LRU location is equal to the total number of pages.

After the allocation cost of the base region 310 is calculated, an allocation cost of the predefined region 320 is calculated based on the allocation cost of the base region 310 at step S430. A cost for each predefined region 320 can be calculated as the sum of costs of pages that belong to the predefined region 320. Next, the predefined region 320 having the smallest costs is selected at step S440. The selected predefined region 320 is allocated to the device at step S450.

An allocation cost for each page that requires continuous memory allocation in the eviction-based cache 140 is lighter than that of the memory region of the kernel. This is because there is no page copy for data migration and pages are managed by an independent system component that is the eviction-based cache 140. Furthermore, a reduction in the memory efficiency of the entire system is small even when there is continuous memory allocation because the eviction-based cache 140 is not important in the buffer cache within the kernel and the eviction-based cache 140 manages only evicted pages.

Figure 5A:
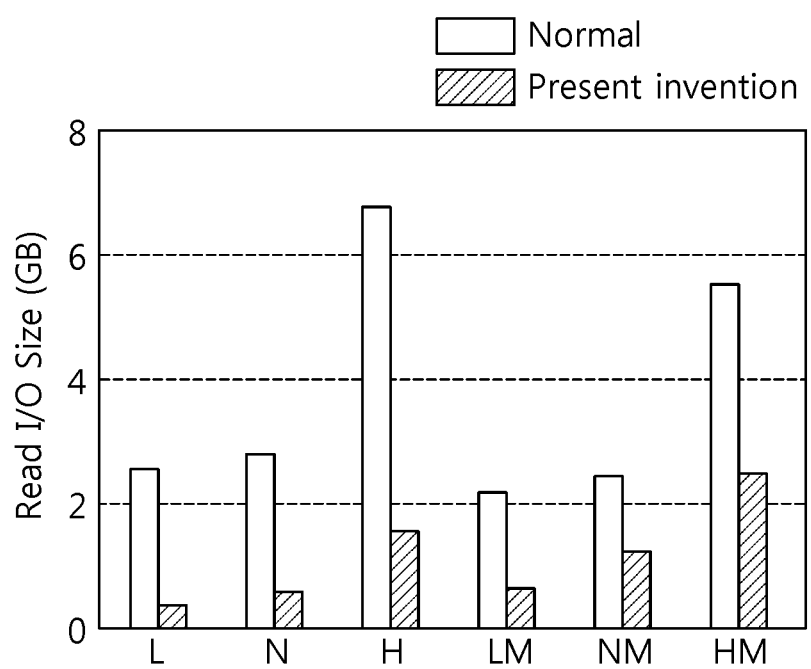
FIG. 5A is a diagram illustrating a comparison between read I/O sizes which occur when each work load is executed for a comparison of performance of the memory management apparatus in accordance with an embodiment of the present invention.

FIG. 5A is a diagram illustrating a comparison between read I/O sizes which occur when each work load is executed in flash memory read size for a comparison of performance of the memory management apparatus in accordance with an embodiment of the present invention. The simulations of the present invention were executed using a Nexus S smart phone on the Android Open Source Project and the scheme of the present invention within Linux kernel 2.6.25.7. Furthermore, the simulations reveal 6 different word load types. In FIG. 5A, 'L' indicates a light work load and shows a case where 12 essential applications and 1 game application are executed, 'N' indicates a normal work load and shows a case where an additional social network application and additional game and document reader are executed, and 'H' indicates a heavy work load and shows a case where another useful application is executed in a normal work load. Furthermore, since multimedia applications (e.g., a movie, a moving image, and a camera) use different frequencies, 'LM' indicates light multimedia, 'NM' indicates normal multimedia, and 'HM' indicates heavy multimedia.

From FIG. 5A, it can be seen that the scheme of the present invention can operate with a work load four times greater than a normal case (i.e., the basic execution ability of an eviction-based cache and flash device within the Nexus S smart phone) because the scheme of the present invention is different in an average read I/O size from the normal case in the flash read size. This is because an average 4 KB read response time of 0.07 msec is 20 times faster than flash read (1.51 sec) because the eviction-based cache is an in-memory cache. It can be seen that the scheme of the present invention can reduce a read I/O size of 76% to 85% as compared with the normal case.

Figure 5B:
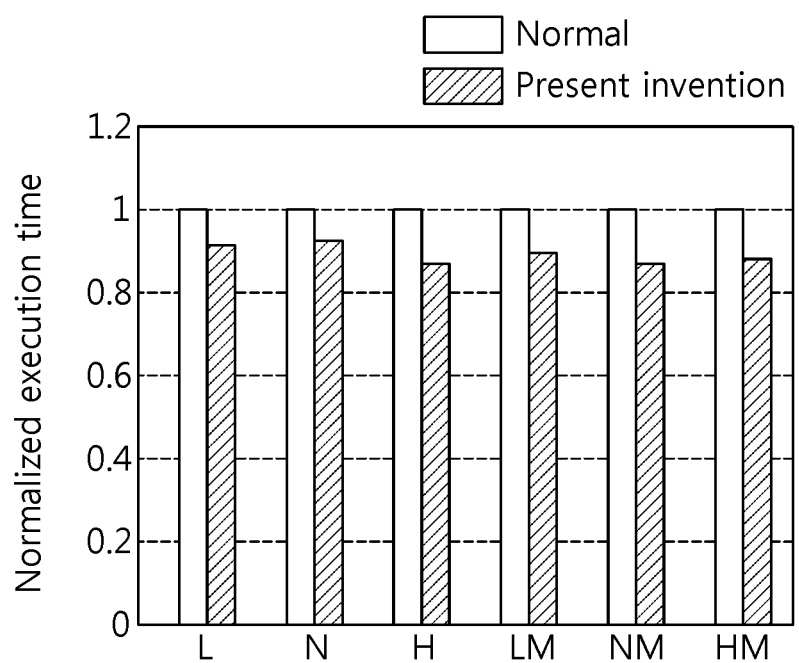
FIG. 5B is a diagram illustrating a comparison between normalized execution times for a comparison of performance of the memory management apparatus in accordance with an embodiment of the present invention.

FIG. 5B is a diagram illustrating a comparison between normalized execution times for a comparison of performance of the memory management apparatus in accordance with an embodiment of the present invention. From FIG. 5B, it can be seen that the scheme of the present invention reduces a number of read I/O operations and thus provides an execution time reduced by 8% to 16% as compared with a normal case. The greatest advantage of the eviction-based cache while an application is executed is generated in a reduction of read I/O operations.

Figure 6:
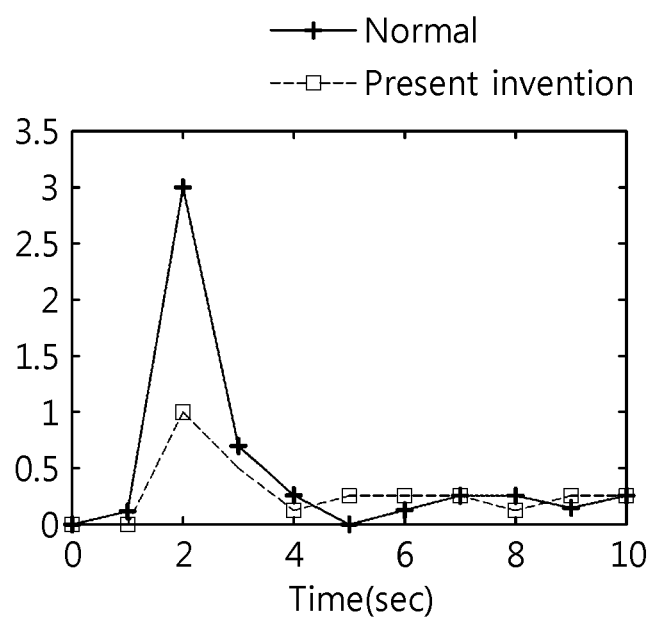
FIG. 6 is a diagram illustrating a comparison between read I/O sizes which occur while a movie application is executed for a comparison of performance of the memory management apparatus in accordance with an embodiment of the present invention.

FIG. 6 is a diagram illustrating a comparison between read I/O sizes which occur while a movie application is executed for a comparison of performance of the memory management apparatus in accordance with an embodiment of the present invention. From FIG. 6, it can be seen that when a movie application is executed, a read I/O throughput (MB/s) in the scheme of the present invention is much smaller than that in a normal case. That is, it can be seen that in the normal case, more read I/O operations appear while the movie application is executed between 1 to 3 seconds, whereas in the scheme of the present invention, an increment of read I/O operations while the movie application is executed between 1 to 3 seconds is further reduced.

In accordance with the memory management apparatus, method, and system of the present invention, since a memory region reserved for a device is used as the eviction-based cache depending on whether the device is active or not, all cached contents can be discarded and the reserved memory region can be immediately used by the device when the device wants to use the reserved memory region. Furthermore, there is an advantage in that a rapid and alternative operation is performed because the eviction-based cache manages each page frame with overhead smaller than that of an OS and thus a unit time taken to evict the contents of each page is very small.

Although the present invention has been described with reference to the drawings and embodiments, the scope of the invention is not intended to be limited to the drawings and embodiments, and a person having ordinary skill in the art will understand that the present invention may be modified and changed in various ways without departing from the spirit and scope of the present invention which are written in the claims.

What is claimed is:

1. An OS-based memory management apparatus associated with main memory, comprising:
a memory allocation controller configured to control a first memory region within the main memory such that the first memory region, comprising reservation memory for an input/output device among input/output devices, is used as a buffer cache when the input/output device is not active; and
a first buffer cache within the OS,
wherein:
the memory allocation controller controls the first memory region such that the first memory region is used as an eviction-based cache comprising an interface configured to control disposition of information therewithin;
the first memory region is used as the eviction-based cache for caching pages evicted from the first buffer cache; and
the memory allocation controller controls:
an original copy of data cached in the first memory region so that the original copy is stored in an external storage space, and
the first memory region such that all contents cached in the first memory region are discarded and the first memory region is immediately used by the input/output device in response to an indication that the first memory region is to be used by the input/output device.

2. The memory management apparatus of claim 1, wherein:
the first memory region is managed according to a Least Recently Used (LRU) method,
a page evicted from the first buffer cache is placed in a Most Recently Used (MRU) location of the first memory region, and
when the first buffer cache accesses the evicted page, the evicted page is migrated to the first buffer cache.

3. The memory management apparatus of claim 1, wherein:
the first memory region comprises one or more predefined regions, and
respective input/output devices are allocated to respectively allocated predefined regions, and the predefined regions are calculated based on a continuous region required by a system when the system boots up.

4. The memory management apparatus of claim 1, wherein:
if a respective input/output device requests to allocate a predefined region, all continuous memory regions are allocated to at least one of the respective input/output devices although the at least one of the input/output devices requests to allocate all the continuous memory regions simultaneously, and
a continuous memory region not belonging to the predefined region is not allocated.

5. The memory management apparatus of claim 3, wherein the memory allocation controller allocates a memory region within the first memory region to the input/output device based on an allocation cost for the predefined region of the input/output device in order to improve cache efficiency of the first memory region if a continuous memory request is received from the input/output device.

6. The memory management apparatus of claim 5, wherein the allocation cost of the predefined region is calculated using an LRU location if a cached page is to be discarded.

7. The memory management apparatus of claim 5, wherein the memory allocation controller allocates a region having a minimum allocation cost, from the predefined region, to the input/output device.

8. A method of managing, by an OS-based memory management apparatus associated with main memory, the method comprising:
controlling, at a memory allocation controller, a first memory region within the main memory such that the first memory region, comprising reservation memory for an input/output device among input/output devices, is used as a buffer cache when the input/output device is not active,
wherein an operating system (OS) comprises a first buffer cache, and
wherein:
the first memory region is used as an eviction-based cache comprising an interface configured to control disposition of information therewithin;
the first memory region is used as the eviction-based cache for caching pages evicted from the first buffer cache; and
the memory allocation controller controls:
an original copy of data cached in the first memory region so that the original copy is stored in an external storage space, and
the first memory region such that all contents cached in the first memory region are discarded and the first memory region is immediately used by the input/output device in response to an indication that the first memory region is to be used by the input/output device.

9. The memory management method of claim 8, wherein the first memory region is used as the eviction-based cache for caching pages evicted from the first buffer cache within the OS.

10. The memory management method of claim 8, wherein the memory allocation control step comprises controlling the first memory region such that all contents cached in the first memory region are discarded and the first memory region is immediately used by the input/output device if the first memory region is desired to be used by the input/output device.

11. The memory management method of claim 9, wherein:
the first memory region is managed according to a Least Recently Used (LRU) method,
a page evicted from the first buffer cache is placed in a Most Recently Used (MRU) location of the first memory region, and
when the first buffer cache accesses the evicted page, the evicted page is migrated to the first buffer cache.

12. The memory management method of claim 8, wherein:
the first memory region comprises one or more predefined regions, and
respective input/output devices are allocated to respectively allocated predefined regions, and the predefined regions are calculated based on a continuous region required by a system when the system boots up.

13. The memory management method of claim 12, wherein the memory allocation control step comprises allocating a memory region within the first memory region to the input/output device based on an allocation cost for the predefined region of the input/output device in order to improve cache efficiency of the first memory region if a continuous memory request is received from the input/output device.

14. The memory management method of claim 13, wherein the allocation cost of the predefined region is calculated using an LRU location if a cached page is to be discarded.

15. The memory management method of claim 13, wherein the memory allocation control step comprises allocating a region having a minimum allocation cost, from the predefined region, to the input/output device.

16. A memory system, comprising:
main memory configured to comprise a first memory region that allows memory reservation for an input/output device; and
an operating system (OS) associated with the main memory,
wherein the operating system uses the first memory region as a buffer cache when the input/output device, among input/output devices, is not active, and the first memory region is used as an eviction-based cache comprising one or more interfaces configured to control disposition of information therewithin, and
wherein:
the OS comprises a first buffer cache;
the first memory region is used as the eviction-based cache for caching pages evicted from the first buffer cache; and
the memory allocation controller controls:
an original copy of data cached in the first memory region so that the original copy is stored in an external storage space, and
the first memory region such that all contents cached in the first memory region are discarded and the first memory region is immediately used by the input/output device in response to an indication that the first memory region is to be used by the input/output device.

* * * * *